Nov. 28, 1950 B. O. M. GALL 2,531,845
WIRELESS RECEIVER COMPRISING AUTOMATIC GAIN CONTROL
Filed Feb. 7, 1947
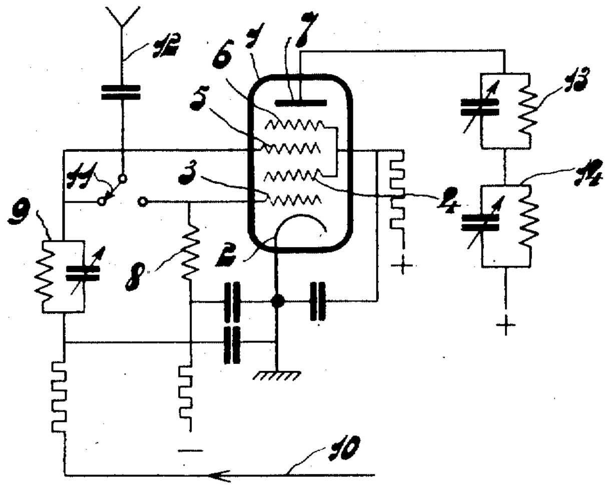
B.O.M. GALL
INVENTOR
BY Fred M Vogel
AGENT Patented Nov. 28, 1950

2,531,845

UNITED STATES PATENT OFFICE 2,531,845

WIRELESS RECEIVER COMPRISING AUTOMATIC GAIN CONTROL

Bernardus Octavianus Maria Gall, Eindhoven, Netherlands, assignor to Hartford National Bank and Trust Company, Hartford, Conn., as trustee Application February 7, 1947, Serial No. 727,186
In the Netherlands July 29, 1944

Section 1, Public Law 690, August 8, 1946
Patent expires July 29, 1964

3 Claims. (Cl. 179—171)

This invention relates to a wireless receiver comprising automatic gain control, which is designed for the reception of one or more ranges of broadcasting waves and of one or more ranges of ultrashort waves.

In the wireless receivers with automatic gain control of the common type the incoming signal, together with a control voltage for the gain control, is supplied to the control grid of one or more high-frequency or intermediate-frequency amplifying tubes, which control grid has a variable pitch. In the reception of broadcasting waves a satisfactory control is thus obtained, whereby very strong signals may be amplified with small distortion and substantially without cross-modulation, since owing to the variable pitch of the control grid the tube has a considerable grid space. In the reception of ultra-short waves difficulties arise, however, and this inter alia because the capacity between the input control grid and the cathode varies by the control, thus causing the input oscillatory circuit to be detuned. This drawback might be obviated by supplying the control voltage and the signal voltage to different grids, but this method has the drawback that the grid space remains constant during the control so that only comparatively weak signals can be amplified without distortion.

The present invention purports to provide a circuit whose operation is satisfactory both for broadcasting waves and for ultrashort waves.

According to the invention, in at least one high-frequency stage use is made of a discharge tube having two control grids, the control voltage for the gain control being supplied to the outer control grid and the signal voltage in the reception of broadcasting waves and of ultra-short waves being supplied to the outer control grid and to the inner control grid respectively.

Use is preferably made of a discharge tube of such a construction that a variation of the voltage of the outer control grid does not bring about any variation of the capacity between the inner control grid and the cathode.

In order that the invention may be clearly understood and readily carried into effect, it will be set out more fully by reference to the accompanying drawing.

The drawing shows a high-frequency amplifying stage of a wireless receiver in which the invention is utilised and in which the amplifying tube used is an hexode tube 1, which comprises a cathode 2, an inner control grid 3, a screen grid 4, an outer control grid 5, a second screen grid 6, and an anode 7. Between the inner control grid 3 and the cathode 2 there is arranged an inductance coil 8 which constitutes, together with the input capacity of the control grid 3, an oscillatory circuit tuned to an ultra-high frequency. Between the outer control grid 5 and the cathode 2 there is included an oscillatory circuit 9 which is tunable in the region of the broadcasting waves.

The control grid 3 has a fixed negative biasing potential and has a constant pitch. The control grid 5, which preferably has a variable pitch, has supplied to it, through a conductor 10, a control voltage for the gain control, which is obtained by rectification of the incoming signal. By means of a switch 11 an aerial 12 may be coupled at will either to the control grid 5 for the reception of broadcasting waves, or to the control grid 3 for the reception of ultra-short waves.

The anode circuit of tube 1 includes an oscillatory circuit 13, which is tunable to the broadcasting waves and an oscillatory circuit 14, which is tunable to an ultrahigh frequency. The circuit 13 has a very low impedance for ultrahigh frequencies, the circuit 14 having a very low impedance for the broadcasting frequencies.

Since the control grid 3 is wound with constant pitch, it is possible to obtain a very high mutual conductance for ultra-short waves. The input capacity of the tube is, moreover, in the reception of ultra-short waves substantially independent of the gain control.

Supplying the control voltage for the automatic gain control to the control grid 5 allows of an efficacious gain control in any frequency range, while in the reception of broadcasting waves a grid space is present which is sufficient for the reproduction of very strong signals without distortion.

In a circuit according to the invention use may be made with particular advantage of a tube in which the outer control grid is followed by one or more secondary-emission electrodes.

What I claim is:

1. In a receiver circuit arrangement adapted for the reception of a first input signal and a second input signal whose frequency is lower than the frequency of the first signal and provided with means to develop an automatic volume control potential in accordance with the signals, a high frequency stage comprising an electron discharge tube having in the order named a cathode, a first control grid, a second control grid and an output electrode, means to apply said automatic volume control potential exclusively to said second control grid, a first input circuit tuned to the frequency of said first signal and coupled to said first control grid, a second input circuit tuned to the frequency of said second signal and coupled to said second control grid, an output circuit coupled to said output electrode, and means selectively to apply said first signal to said first input circuit thereby to apply said first signal exclusively to said first control grid and to apply said second signal to said second input circuit thereby to apply said second signal exclusively to said second control grid.

2. In a receiver circuit arrangement adapted for the reception of a first input signal and a second input signal whose frequency is lower than the frequency of the first signal and provided with means to develop an automatic volume control potential in accordance with the signals, a high frequency stage comprising an electron discharge tube having in the order named a cathode, a first helically wound control grid, a screen grid, a second helically wound control grid and an output electrode, said first control grid being wound with a substantially constant pitch and said second control grid being wound with a varying pitch, means to apply said automatic volume control potential exclusively to said second control grid, a first input circuit tuned to the frequency of said first signal and coupled to said first control grid, a second input circuit tuned to the frequency of said second signal and coupled to said second control grid, an output circuit coupled to said output electrode, and means selectively to apply said first signal to said first input circuit thereby to apply said first signal exclusively to said first control grid and to apply said second signal to said second input circuit thereby to apply said second signal exclusively to said second control grid.

3. In a receiver circuit arrangement adapted for the reception of a first input signal and a second input signal whose frequency is lower than the frequency of the first signal and provided with means to develop an automatic volume control potential in accordance with the signals, a high frequency stage comprising an electron discharge tube having in the order named a cathode, a first control grid, a screen grid, a second control grid and an output electrode, said screen grid isolating said first and second control grids, means to apply said automatic volume control potential exclusively to said second control grid, a first input circuit tuned to the frequency of said first signal and coupled between said first control grid and said cathode, a second input circuit tuned to the frequency of said second signal and coupled between said second control grid and said cathode, an output circuit coupled to said output electrode, and switch means selectively to apply said first signal to said first input circuit thereby to apply said first signal exclusively to said first control grid and to apply said second signal to said second input circuit thereby to apply said second signal exclusively to said second control grid.

BERNARDUS OCTAVIANUS MARIA GALL.

REFERENCES CITED

The following references are of record in the file of this patent:

UNITED STATES PATENTS

| Number | Name | Date |
|---|---|---|
| 2,041,291 | Johnson | May 19, 1936 |
| 2,043,092 | Black | June 2, 1936 |
| 2,057,857 | Steimel et al. | Oct. 20, 1936 |
| 2,129,727 | Barber | Sept. 13, 1938 |
| 2,179,298 | Manke | Nov. 7, 1939 |
| 2,263,825 | Loughren | Nov. 25, 1941 |